(12) United States Patent
Nguyen et al.

(10) Patent No.: US 11,862,007 B2
(45) Date of Patent: Jan. 2, 2024

(54) METHOD FOR AUTOMATICALLY ANALYZING AND FILTERING OUT REDUNDANT ALARMS IN THE FAULT MANAGEMENT SYSTEM OF RADIO TRANSCEIVER STATIONS

(71) Applicant: VIETTEL GROUP, Ha Noi (VN)

(72) Inventors: Tien Luc Nguyen, Ha Nam Province (VN); Khac Tung Nguyen, Ha Noi (VN); Khanh Nguyen, Hai Duong Province (VN); Trong Duc Nguyen, Thai Binh Province (VN); Viet Long Nguyen, Ha Noi (VN)

(73) Assignee: VIETTEL GROUP, Ha Noi (VN)

( * ) Notice: Subject to any disclaimer, the term of this patent is extended or adjusted under 35 U.S.C. 154(b) by 0 days.

(21) Appl. No.: 17/747,821

(22) Filed: May 18, 2022

(65) Prior Publication Data

US 2023/0005359 A1    Jan. 5, 2023

(30) Foreign Application Priority Data

Jul. 2, 2021    (VN) ................ 1-2021-04079

(51) Int. Cl.
*G08B 29/18* (2006.01)
*G08B 21/02* (2006.01)

(52) U.S. Cl.
CPC ......... *G08B 29/18* (2013.01); *G08B 21/0219* (2013.01)

(58) Field of Classification Search
CPC ...... G08B 29/18; H04W 24/04; H04L 41/069; H04L 41/00; H04L 41/06; H04L 41/0604
See application file for complete search history.

(56) References Cited

U.S. PATENT DOCUMENTS

| | | | |
|---|---|---|---|
| 7,434,109 B1 * | 10/2008 | Stabile | H04L 41/0681 709/224 |
| 9,373,246 B2 * | 6/2016 | Fiske | G08B 26/008 |
| 2008/0080311 A1 * | 4/2008 | Eperjesi | G01V 1/00 367/76 |
| 2009/0070640 A1 * | 3/2009 | Stabile | H04L 41/0681 715/228 |

* cited by examiner

*Primary Examiner* — Mirza F Alam
(74) *Attorney, Agent, or Firm* — patenttm.us

(57) ABSTRACT

The invention provides a method for automatically analyzing and filtering redundant alarms in radio transceiver systems consisting of the following steps: step 1: the operator shall define the relationship between the alarms, defining rules to filter redundant alarms at the FRDU block; step 2: the FSU block will detect the alarm and send it to the FAFU block; step 3: FAFU block will receive alarms from FSU, based on the rules defined in FRDU block will analyze and filter out redundant alarms; Step 4: The FSMU block will receive the alarms after being filtered, stored in the database and also send these alarms to the EMS system.

3 Claims, 6 Drawing Sheets

METHOD FOR AUTOMATICALLY ANALYZING AND FILTERING OUT REDUNDANT ALARMS IN THE FAULT MANAGEMENT SYSTEM OF RADIO TRANSCEIVER STATIONS

FIELD OF THE INVENTION

This invention relates to automatic methods used to analyze and filter redundant alarms which are generated in the fault management system of the transceiver system. The method is utilized in 4G transmission stations (Evolved Universal Terrestrial Radio Access NodeB—eNodeB) and 5G transmission stations (Next Generation NodeB—gNodeB). Method support operators in monitoring faults are raised in operations process of transceiver system and help quickly find reasons of fault so that it reduces effort, time, cost of operation and maintenance procedures of telecommunication network which can interrupts network services.

BACKGROUND OF THE INVENTION

Fault monitoring and management is the most important thing for operations of the telecommunication system. All faults must be supervised by a fault monitoring and management system. Fault sources would be from hardware, software, alarm of interruption of services. In the monitoring process, all abnormal cases would be shown in a fault interface in web or monitoring application in order to inform how the operations technician decides to resolve these faults. The problem is operations technicians must handle all faults as quickly as possible in order to prevent interruption of network services or decreases in the quality of service. In the worst cases, network services can be lost, the fault would not be resolved.

The operation of the telecommunication system is basically composed of an operation of EMS (Element Management System) and of the operation of base stations. An EMS manages and monitors base stations. Fault management functionality and raising alarms at the station would be sent to the central monitoring system—EMS. The operations technician must supervise all alarms of all transmission stations at EMS. Fault management of some stations will send SMS messages to a phone of a practical operations technician who is responsible for those stations.

As mentioned previously monitoring and maintaining all transceiver stations without raising fault is important to ensure faultless and clear communication. But in practice, there are many alarms in a station that are being raised by a fault and sent to EMS. The reason for this phenomenon is a consequence of an occurrence fault, for example, if a fault occurs in a hardware component, then software alarm and service alarm would be raised as a result of this. Therefore, the operations and maintenances will meet obstacles because this fault would not correctly be identified by these alarms and one would not know which alarm should be handled first. If the process of root fault handling is correct, then no alarm would be raised anymore. If the process of root fault is not correct, more time is spent for fault handling and service interruption time.

In addition, each alarm has an independent handling process and these processes would be handled separately by a different technician, so there are many interleaved handlings by different technicians which creates additional alarms. These make alarm monitoring and fault identifying more difficult. Work is that alarms must be filtered by the system and correct alarms with corresponding root fault will be showed to bring more effectiveness in the fault handling process.

To resolve this problem the inventor of the invention has researched and recommend an automatic analysis method and filtering out of alarm redundancies in the fault management system of the transceiver station. If the method in the invention is applied, less time is used for fault handling than not used and reduced personal cost and advance the quality of telecommunication services are achieved.

SUMMARY OF THE INVENTION

The invention provides an automatic analysis method and filtering alarm redundancy in the fault management system of the transceiver system. To implement this method, a correlation between alarms that are raised in the station would be found by the management system, so that the system identifies which alarms are important, and should be kept, and which are not important, with no need to keep any more. So these alarms are a consequence of important alarms and those that have no meaning will be filtered automatically. When applying this method, the number of alarms over time will be significantly reduced, making for easier operation and handling of errors.

In this invention, the design of a fault management system for radio transceiver stations includes the following components:

Fault Source Unit (FSU) for monitoring and detecting alarms. The location of this block is placed on all hardware components of radio stations. In a system, there will be many monitoring and alarm detection blocks. The task of this block is to monitor and detect failures of hardware components, software, service, etc. The FSU block periodically monitors hardware components, as well as software failures. When an error is detected, an alarm will be reported. Based on the severity of the alarm and its impact on the system, the FSU block will categorize it as Critical, Major, Minor, or Warning. The output of the block consists of all the raw alarms detected by the system, and this output serves as the input for the Fault Analysis and Filtering Unit block.

The Fault Analysis and Filtering Unit (FAFU) plays the most important role in the system. All alarms from the alarm detection and monitoring blocks will be sent to this unit for processing and filtering. The function of this block is based on correlation and the relationship between alarms; it identifies the most important root alarm to retain, while filtering out other less significant alarms. To establish the correlation between alarms, it requires defining alarm rules as input to the block responsible for analyzing and filtering the alarms. The function of this block is described in detail in step 3 of the present invention.

Fault Rules Defined Unit (FRDU). The function of this block is to allow operators to define relationships between alarms and to establish rules for filtering out redundant alarms. The present invention defines four types of relationships between two alarms: a 1-1 relationship, a 1-n relationship, an n-1 relationship, and an n-n relationship. Detailed definitions of each type of relationship will be described in the following section. This output serves as the input for the Fault Analysis and Filtering Unit block. Based on these relationships, the FAFU block can filter out redundant alarms. After being filtered by the FRDU block, the alarm will be stored in the Fault Storage and Monitoring Unit. The function of this block is described in detail in step 1 of the present invention.

Fault Storage and Monitoring Unit (FSMU) is responsible for storing the original alarms in the database after the FAFU block filters out redundant alarms. Additionally, this block is equipped with the function to send these alarms to the EMS.

Specifically, the present invention provides a method to automatically analyze and filter out redundant alarms in the fault management system of radio transceiver stations, including the following steps:

Step 1: The mining operator will define the relationship between alarms, define rules to filter redundant alarms at the FRDU block. The present invention defines four types of relationships between two alarms: 1-1 relationship, 1-n relationship, n-1 relationship, and n-n relationship. Mining operators will use the EMS centralized management system interface to define a model for the relationships between alarms.

Step 2: The FSU block will detect the alarm and send it to the FAFU block. The alarm detection and monitoring unit (FSU) is located in the hardware components in the radio base station so that monitoring will detect the alarm and send the alarms to the analyzer and filter the residual alarm (FAFU).

Step 3: FAFU block will receive alarms from FSU block, based on the rules defined in FRDU block will analyze and filter out redundant alarms. At this step, after receiving the alarms from the FSU block, the FAFU block will rely on the rules defined in the FRDU block and the possible scenarios for the two related alarms, the system will analyze and filter out redundant alarms.

Step 4: The FSMU block will receive the alarms after being filtered, stored in the database, and also send these alarms to the EMS system. At this step, after receiving the alarms sent, the EMS system provides an interface to display a list of current alarms for timely handling by operators.

DETAILED DESCRIPTION

Figure 1:
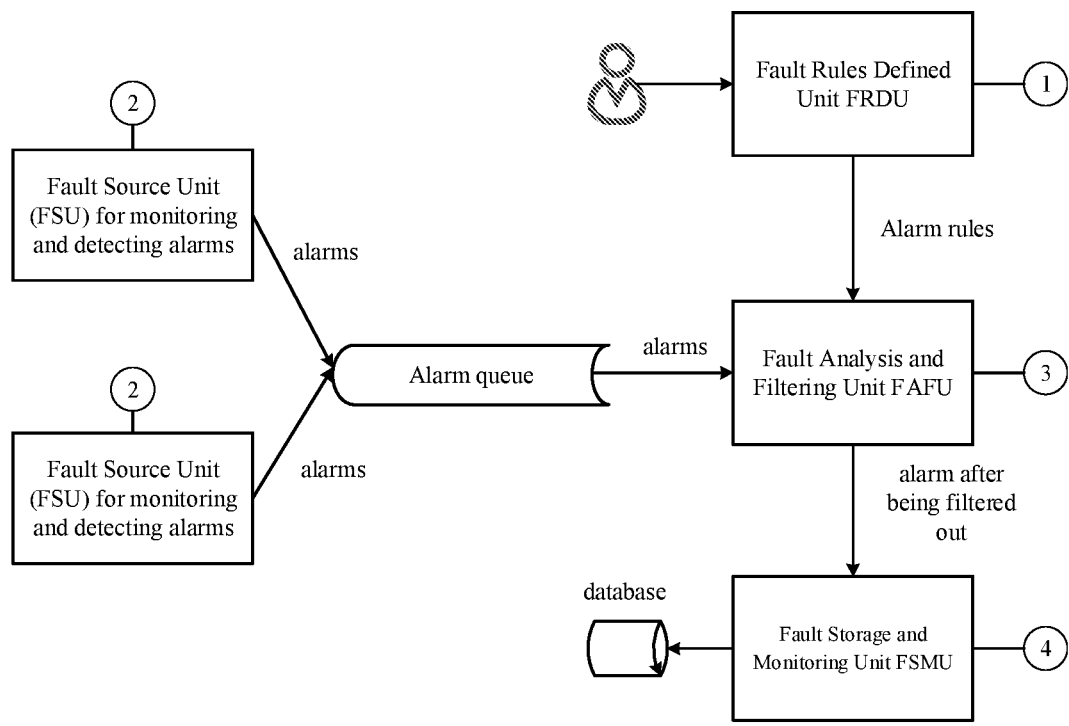
FIG. 1 is a drawing depicting the blocks in the fault management system of radio transceiver stations and the implementation steps of the invention.

The following sections describe in detail the automatic analysis and filtering of redundancies in the base station fault management system. FIG. 1 shows the steps in the analysis and identification of the original alarm. The method mentioned in the present invention uses a system with the following functional blocks:

Fault Source Unit (FSU) for monitoring and detecting alarms. The location of this block is placed on all hardware components of radio stations. In a system, there will be many monitoring and alarm detection blocks. The task of this block is to monitor and detect failures of hardware components, software, service, etc. The FSU block periodically monitors hardware components, as well as software failures. When an error is detected, an alarm will be reported. Based on the severity of the alarm and its impact on the system, the FSU block will categorize it as Critical, Major, Minor, or Warning. The output of the block consists of all the raw alarms detected by the system, and this output serves as the input for the Fault Analysis and Filtering Unit block.

The Fault Analysis and Filtering Unit (FAFU) plays the most important role in the system. All alarms from the alarm detection and monitoring blocks will be sent to this unit for processing and filtering. The function of this block is based on correlation and the relationship between alarms; it identifies the most important root alarm to retain, while filtering out other less significant alarms. To establish the correlation between alarms, it requires defining alarm rules as input to the block responsible for analyzing and filtering the alarms. The function of this block is described in detail in step 3 of the present invention.

Fault Rules Defined Unit (FRDU). The function of this block is to allow operators to define relationships between alarms and to establish rules for filtering out redundant alarms. The present invention defines four types of relationships between two alarms: a 1-1 relationship, a 1-n relationship, an n-1 relationship, and an n-n relationship. Detailed definitions of each type of relationship will be described in the following section. This output serves as the input for the Fault Analysis and Filtering Unit block. Based on these relationships, the FAFU block can filter out redundant alarms. After being filtered by the FRDU block, the alarm will be stored in the Fault Storage and Monitoring Unit. The function of this block is described in detail in step 1 of the present invention.

Fault Storage and Monitoring Unit (FSMU) is responsible for storing the original alarms in the database after the FAFU block filters out redundant alarms. Additionally, this block is equipped with the function to send these alarms to the EMS.

Based on a system with the above functional blocks, the steps to implement the method are as follows:

Step 1: Operators will define relationship between alarms, define rules to filter redundant alarms at FRDU block.

Figure 2:
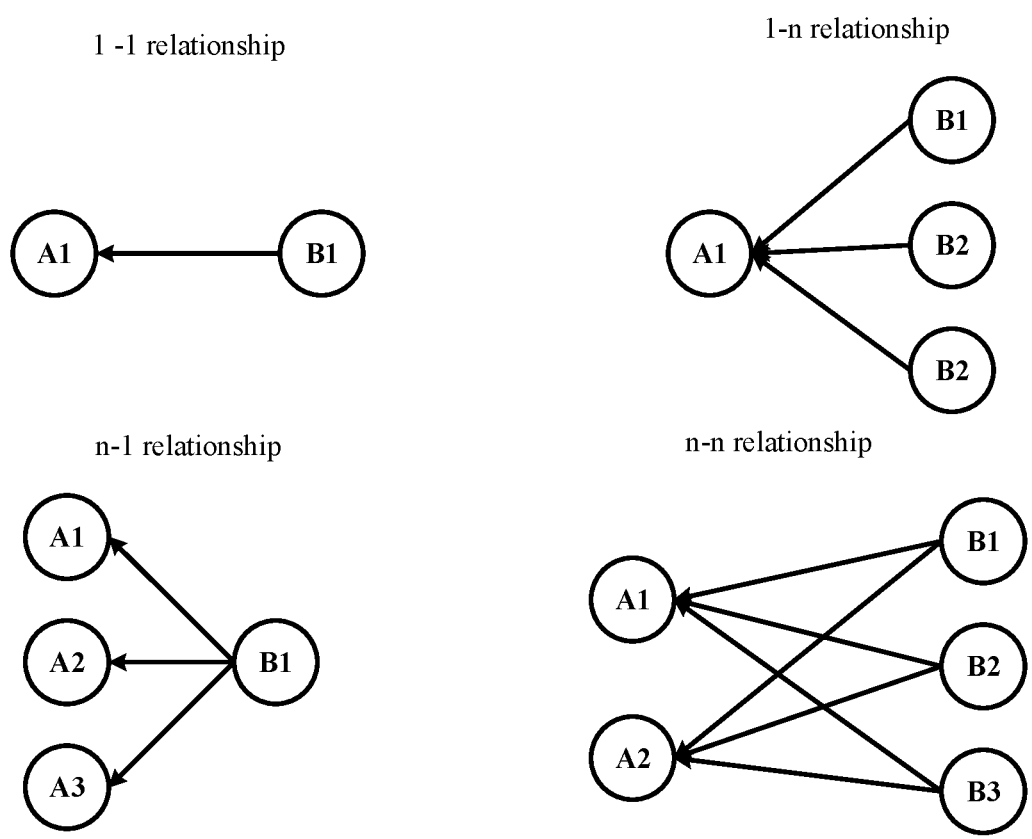
FIG. 2 shows the relationship between alarms in a two-level system.

To define the binding relationship between the alarms, FIG. 2 describes in detail the types of relationships between the two alarms in the system. The present invention defines four types of relationships between two alarms: 1-1 relationship, 1-n relationship, n-1 relationship and n-n relationship. Specifically:

The first is a 1-1 relationship, which defines a parent alarm that will have only one child alarm. This means that when the system generates a parent alarm, there will always be a child alarm attached.

The second type of relationship is a 1-n relationship, one parent alarm will have more than one child alarm. This means that when the system generates a parent alarm, there will always be more than one child alarm associated with it.

The third type of relationship is the n-1 relationship, a child alarm can be the child of many different parent alarms. This means that when the system generates many different parent alarms, all of which are accompanied by the same child alarm The final type of relationship is an n-n relationship, a parent alarm will have many different child alarms at the same time, a child alarm is also a child of many different parent alarms. The n-n relationship will be the most complex. The FRDU block will allow these relationships to be defined. The relationship definition will only need to be done once and is typically established during the development of the device manufacturer's alarms. The mining operator needs to read the model instructions to understand and utilize these predefined relationships effectively. During operation, error managers can still be given permission to change these relationships.

Figure 3:
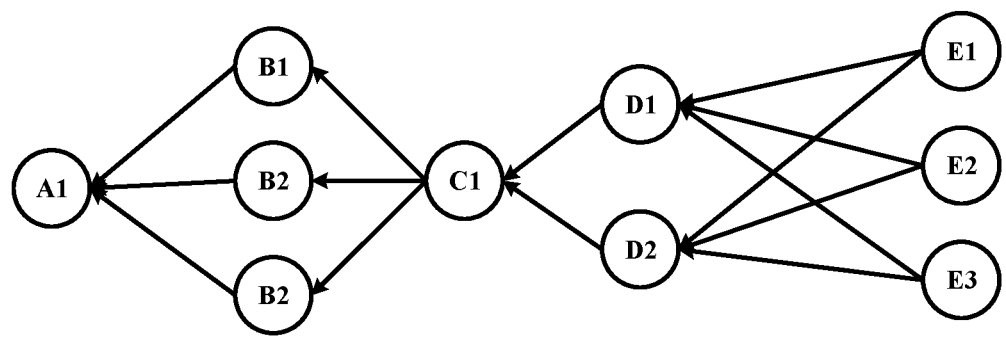
FIG. 3 is a drawing depicting the relationships between alarms in a multi-level system.

In practice, the relationship between alarms is not simply a relationship between two alarms, these relationships can be hierarchical according to a multi-level model as depicted for example in FIG. 3. From the classification diagram At this level, from any alarm one can identify all its parent and child alarms. For example, alarm D1, D2 is the child of alarms A1, B1, B2, B3, C1 and the parent of alarms E1, E2. In this multi-level relationship model, there will be two types of relationships: direct and indirect relationships. The direct relationship is an unmediated relationship such as the relationship between two alarms A1 and B1, the indirect relationship is the relationship between two alarms A1 and C1 through the intermediate alarms B1, B2, B3.

Operators define these multi-level model relationships on the EMS interface in different ways such as using the drag and drop interface to create the model, using the Command Line Interface—CLI to add, edit, delete relationships.

Step 2: FSU block will detect alarm and send to FAFU block.

The alarm detection and monitoring unit will detect the alarm (FSU) located in the hardware components in the radio base station to monitor and send alarms to the analyzer and filter residual alarms (FAFU). An alarm will have the following properties: alarm name, alarm identifier, alarm object, alarm status, alarm severity, alarm time, and additional information to describe the cause of the occurrence as well as how to resolve the alarm, etc. The severity of the re-alarm includes levels from high to low as follows: critical, major, minor, warning. An alarm's life cycle will have three active states: new, changed, and cleared. When an alarm belonging to an object is detected, the FSU block will set the status of the alarm to the generated state, when the alarm persists but its properties are changed such as severity level. When the alarm's importance changes, the alarm's state will change to the changed state, once the alarm has been resolved, no longer exist the alarm state will change to cleared and end its life. When each state changes, the FSU block sends back alarm information through the FAFU block.

Step 3: FAFU block will receive alarms from FSU, based on the rules defined in FRDU block will analyze and filter out redundant alarms.

In order to be able to filter out redundant alarms, this step of the present invention explicitly describes a filtering mechanism based on the relationship between alarms. Suppose we have two alarms, A and B, where A is the parent alarm of alarm B. We will consider the cases where alarm A occurs first, then alarm B occurs later, the second case. alarm B appears first, then alarm A appears later, in the third case, alarm A goes to a cleared state before alarm B, the last case is alarm B goes to a cleared state before alarm A.

In case alarm A is detected first and has a new status, then alarm B is detected later, because alarm B is a child alarm, the consequence alarm of A, it will be filtered out, the system keeps only alarm A. Similarly for the second case, the system filters out the alarm that comes first as alarm B and keeps the alarm that comes later as alarm A. Alarm filtering This information in the processing system will not be displayed on the monitoring interface, but will still be stored in the database and assigned a status of hidden to distinguish it from unfiltered alarms.

In case alarm A goes to a cleared state before alarm B. The present invention provides modes of treatment for alarm B as follows:

KEEPING Mode: when alarm A changes to aborted state, the system will then consider B's state after a period of time T after alarm A is cleared, then if alarm B is still If it has not yet entered the cleared state, the system will display a alarm B. This is called a non-tight relationship.

FORCED_DELETED Mode: In this way of operation, alarm B will be forced to go to the destroyed state and end its life. This is called a close relationship.

The above operations between two parent and child alarms (A and B) will also be defined in the FRDU block. In the multilevel relationship model, the relationship between indirect parent and child alarms will be a non-tight relationship, so the way it works is to keep (KEEPING Mode).

In case alarm B changes to the cleared state before alarm A, it will not affect the status of alarm A, alarm A will still be displayed on the monitoring system.

The following is a detailed description of the execution flow at the FAFU block:

Step 1: when the FAFU block receives an alarm from the FSU block, based on the relationship between the alarms defined in the FRDU block, the system determines that all the parent and child alarms of the recently received alarm are existing in the list of current alarms.

Step 2: the FAFU block will determine whether the alarm's state is cleared or new, changed state.

Figure 4:
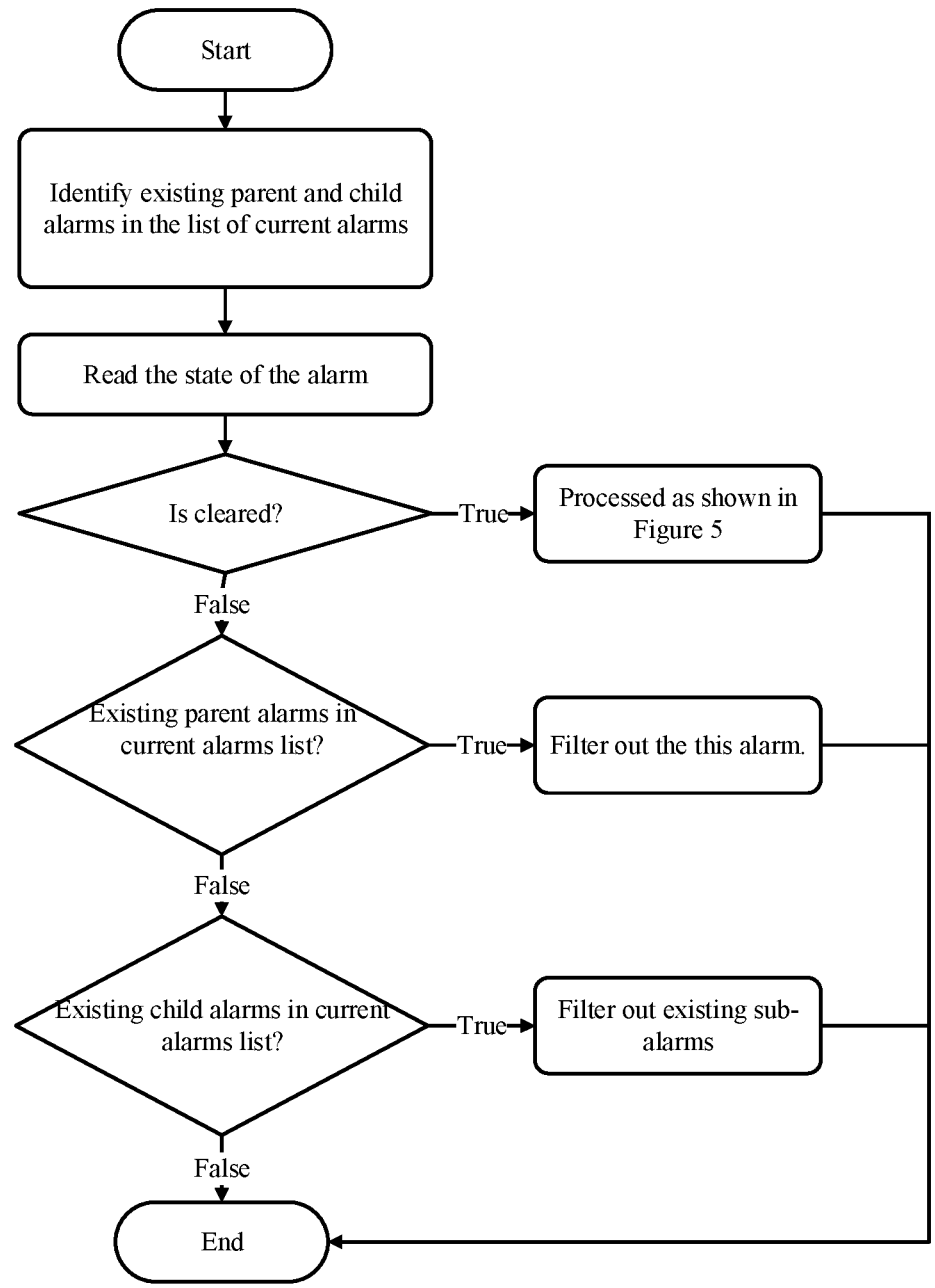
FIG. 4 is a schematic diagram depicting in detail the execution steps of the FAFU block in case the alarm's state is a new or changed state.
Figure 5:
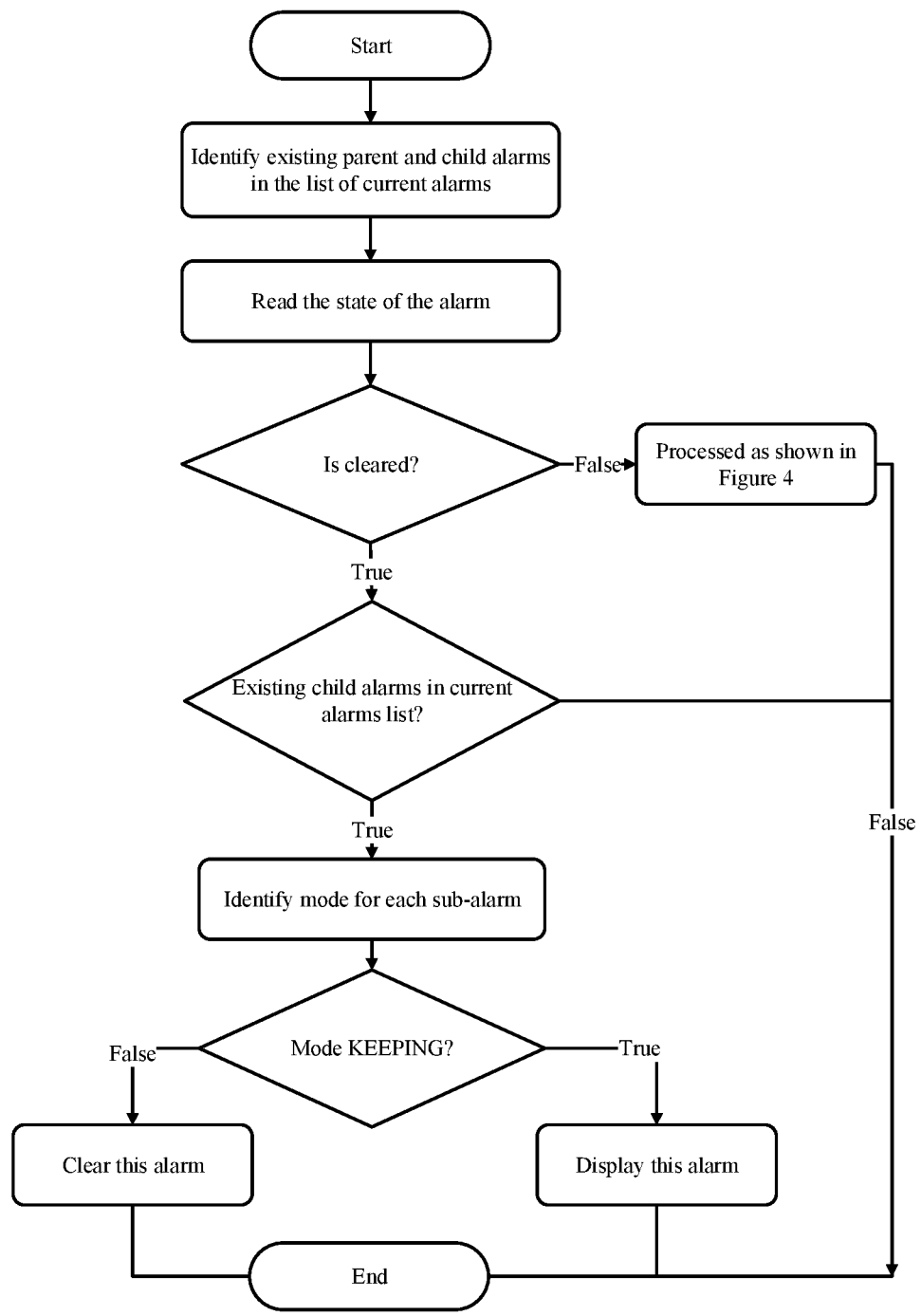
FIG. 5 is a schematic diagram depicting in detail the execution steps of the FAFU block in case the alarm's state is cleared.

Step 3: based on the status of the alarm, the system will process in two separate threads as shown in FIG. 4 and FIG. 5. Specifically:

FIG. 4 is a schematic diagram depicting in detail the execution steps of the FAFU block in case the alarm's state is new or changed state. The steps to take in this case are as follows:

Supposition 1: determines whether in the list current alarms there exist parent alarms of the recently received alarm. If a parent alarm exists, the system will filter the received alarm.

Supposition 2: if no parent alarm exists, the FAFU block determines whether in the list of current alarms there are child alarms of the recently received alarm. In case there are many sub-alarms, the system will filter out these sub-alarm, displaying only the one that has just been received. In the event that no sub-alarm exists, the FAFU block will do nothing for this alarm.

FIG. 5 is a schematic diagram depicting in detail the execution steps of the FAFU block in case the alarm state is aborted state. The steps to take in this case are as follows.

Supposition 1: FAFU block will determine whether in the list of current alarms there exist sub-alarms of the recently received alarm. If a FAFU block exists, it determines whether the handling of these sub-alarms is withholding (KEEPING mode) or forcing a cancellation (FORCED_DELETED mode). If no sub-alarm exists, the FAFU block will do nothing for this alarm.

Supposition 2: if the handling method is hold (KEEPING mode), the system will display all sub-alarms of the received alarm on the mining operator interface; if the method is to force cleared (FORCED_DELETED), the system will perform a state transition of all child alarms to cleared and end its lifecycle.

Step 4: the FSMU block will receive the alarms after being filtered, stored in the database and also send these alarms to the EMS system. The EMS system provides an interface to display a list current alarms for operators to handle timely.

Above are the described steps to implement the method of automatically analyzing and filtering redundant alarms in the fault management system of radio communication stations.

EXAMPLE OF THE INVENTION

To demonstrate the effectiveness of the present invention, a method to automatically analyze and filter out redundant alarms in the fault management system of radio communication stations is implemented and integrated in the fault management system of the stations 5G gNodeB. The results of the invention will help to evaluate the effectiveness of the method proposed in the invention.

For the implementation of the present invention, the FSU blocks shall be placed on the hardware components of the gNodeB station such as the DU, RRU and CU hardware components. The FRDU, FAFU and FSMU blocks will be placed on the CU hardware component to receive alarms from the FSU.

Figure 6:
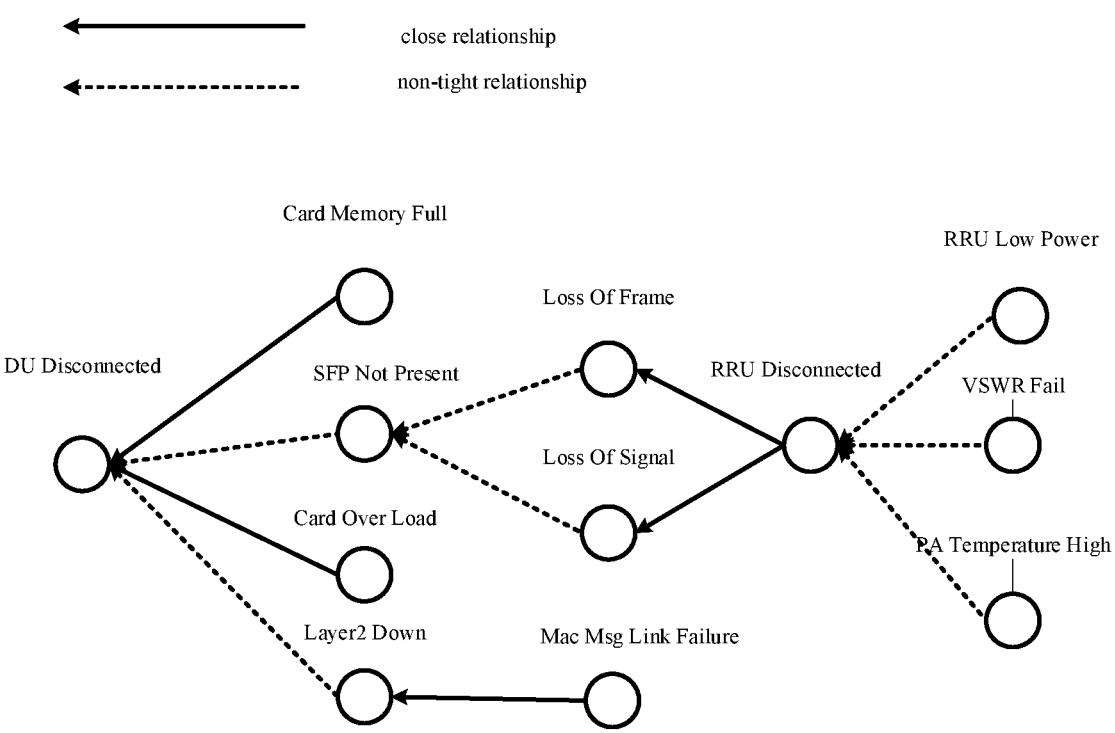
FIG. 6 shows an example of a multi-level relationship between alarms in the gNodeB radio base station fault management system.

FIG. 6 shows an example of a relationship between alarms with how the relationship works.

To illustrate the effectiveness of the present invention, we will perform an experiment as follows: On DU hardware we will perform the withdrawal of the Small Form-factor Pluggable (SFP) module to generate an alarm SFP Not Present. As the relationship between the alarms is defined as shown in FIG. 5, when there is an SFP Not Present alarm, the system will immediately generate additional alarms as Loss Of Frame, Loss Of Signal, RRU Disconnected . . . . We assume that before unplugging the SFP module on the RRU, there are three alarms: RRU Low Power, VSWR Failed, PA Temperature High. All three of these alarms are sub-alarms of the RRU Disconnected alarm. Table 1 describes the difference in the number of alarms displayed when applying the method and when not applying the method in the present invention for the following cases:

TABLE 1

| Case | Current method | Patent method |
| --- | --- | --- |
| When the SFP Not Present alarm is generated | Will always display seven alarms including: SFP Not Present, Loss Of Frame, Loss Of Signal, RRU Disconnected, VSWR Failed, PA Temperature High, RRU Low Power | Display only one alarm SFP Not Present |
| When the SFP Not Present alarm is cleared | Will always display six alarms including: Loss Of Frame, Loss Of Signal, RRU Disconnected, VSWR Failed, PA Temperature High, RRU Low Power | Displays the following alarms: Loss Of Frame, Loss Of Signal |
| When the Loss Of Frame alarm is cleared | Will always display five alarms including: Loss Of Signal, RRU Disconnected, VSWR Failed, PA Temperature High, RRU Low Power | Display only alarm: Loss Of Signal |
| When the Loss Of Signal alarm is cleared | Will always display four alarms including: RRU Disconnected, VSWR Failed, PA Temperature High, RRU Low Power | Display only alarm: RRU Disconnected |

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

What is claimed is:

1. A method for automatically analyzing and filtering out redundant alarms in the fault management system of radio transceiver station devices,
wherein the method comprises the following steps:
step 1: operators defines relationships between the redundant alarms, define rules for filtering redundant alarms at a FRDU (fault rules defined unit) block;
at this step, four types of relationships between a parent alarm and a child alarm are defined including: a 1-1 relationship, a 1-n relationship, a n-1 relationship and a n-n relationship; specifically:
the 1-1 relationship: this relationship defines a parent alarm that will have only one child alarm; this means that when the system generates a parent alarm there will always be a child alarm attached;
the 1-n relationship: this relationship defines a parent alarm that will have more than one child alarm; this means that when the system generates a parent alarm, there will always be more than one child alarm;
the n-1 relationship: this relationship defines a child alarm that can be the child of many different parent alarms; this means that when the system generates many different parent alarms, all of them are accompanied by the same child alarm;
the n-n relationship: this relationship defines a parent alarm that will have many different child alarms at the same time, a child alarm is also a child of many different parent alarms;
the FRDU block will allow the definition of these relationships, the relationship definition will need to be done only once and will normally be defined during the development of the device manufacturer's alarms, the operators only need to read the instructions describing it; during operation, error managers can still be given permission to change these relationships;
the operators define these multi-level model relationships on the interface of a centralized management system (EMS) in different ways such as using a drag-and-drop interface to create a model, using a command line interface (CLI) to add, edit, and delete relationships;
step 2: a FSU (alarm detection and monitoring) block will detect alarm and send to a FAFU (analysis and redundancy alarm filtering) block;
the alarm detection and monitoring block will detect the alarm located in the hardware components in a radio base station to monitor and send alarms, the status of the alarm depending on the period, during, the alarm life for the analysis and redundancy alarm filtering (FAFU) block; wherein:
hardware components in a radio base station include: DU (distributed unit), CU (centralized unit), RRU (radio remote unit);
an alarm will have the following properties: alarm name, alarm identifier, alarm object, alarm status, alarm severity, alarm time, and additional information to describe the cause and resolution of the alarm;
the severity of the alarm includes levels from high to low as follows: critical, major, minor, warning; an alarm's life cycle will have three states of operation as follows: new, changed, cleared;
step 3: the FAFU block will receive alarms from the FSU block, based on the rules defined in the FRDU block will analyze and filter out redundant alarms;

to be able to filter out redundant alarms, the FAFU block will perform the following small steps:
   when the FAFU block receives an alarm from the FSU block, based on the relationship between the alarms defined in the FRDU block, the system will determine that all parent and child alarms of the recently received alarm are existing in the list of currently displayed alarms;
   the FAFU block determines whether the alarm's status is cleared or different;
   depending on the status of the alarm, the system will process in two separate threads according to the alarm's status is cleared or different;
step 4: a FSMU (fault storage and monitoring unit) block will receive the alarms after being filtered, stored in the database and also send these alarms to the EMS system; the EMS system provides an interface that displays a list of ongoing alarms for the operators to handle in a timely manner.

2. The method according to claim 1, in which in step 3:
in case the status of the alarm is different from the cleared status (new state, changed state); the execution steps of the FAFU block in this case are as follows:
   determine whether in the list of displayed alarms there exist parent alarms of the recently received alarm; if a parent alarm exists, the system will filter the received alarm;
   if no parent alarm exists, the FAFU block determines whether in the list of displayed alarms there exists a child alarm of the recently received alarm; in case many sub-alarms exist, the system will filter out these sub-alarms, displaying only the received alarm; in the event that no sub-alarm exists, the FAFU block will do nothing for this alarm;
in case the status of the alarm is cleared; the execution steps of the FAFU block in this case are as follows:
   the FAFU block determines whether in the list of displayed alarms there are sub-alarms of the recently received alarm; if present, the FAFU block determines whether the handling of these sub-alarms is KEEPING mode or FORCED_DELETED mode; if no sub-alarm exists, the FAFU block will not handle this alarm;
   if the handling method is KEEPING mode, the system will display all sub-alarms of the received alarm on the operators interface; if the method is FORCED_DELETED, the system will perform a state transition of all child alarm to cleared and end its lifecycle.

3. The method according to claim 2, of which in step 3:
in case the parent alarm is detected first and has a new status, then the child alarm is detected, because the child alarm is the consequence of the parent, it will be filtered out, the system only keeps the parent alarm;
in case the child alarm is detected first and has new status, then the parent alarm is detected, the system will still filter out the alarm that comes first as the child alarm and keep the later alarm as the parent alarm;
in the case that the parent alarm changes to cleared state before the child alarm, the present invention proposes the following modes of handling the child alarm:
   KEEPING mode: when the parent alarm goes to cleared state, then the system will consider the child's status after a period of time after the parent alarm is cleared, then if the child alarm still hasn't changed to cleared the system state will display a child alarm; This is called a non-tight relationship;
   FORCED_DELETED mode: in this way it works alarm the child will be forced to go to cleared state and end its life cycle; This is called a close relationship;
in case the child alarm changes to the cleared state before the parent alarm, it will not affect the state of the parent alarm, the parent alarm will still be displayed on the operating interface.

\* \* \* \* \*